(12) United States Patent
Broda et al.

(10) Patent No.: US 10,812,519 B2
(45) Date of Patent: Oct. 20, 2020

(54) CYBER THREAT INTELLIGENCE THREAT AND VULNERABILITY ASSESSMENT OF SERVICE SUPPLIER CHAIN

(71) Applicant: BCE INC., Verdun (CA)

(72) Inventors: Maciej Broda, Ottawa (CA); Marc-Andre Hervieux, St-Lazare (CA); Hakem Habib, Oshawa (CA)

(73) Assignee: BCE INC., Verdun (CA)

( * ) Notice: Subject to any disclaimer, the term of this patent is extended or adjusted under 35 U.S.C. 154(b) by 330 days.

(21) Appl. No.: 15/857,815

(22) Filed: Dec. 29, 2017

(65) Prior Publication Data

US 2018/0191768 A1    Jul. 5, 2018

Related U.S. Application Data

(60) Provisional application No. 62/440,124, filed on Dec. 29, 2016.

(51) Int. Cl.
*H04L 29/06* (2006.01)

(52) U.S. Cl.
CPC ...... *H04L 63/1433* (2013.01); *H04L 63/1425* (2013.01)

(58) Field of Classification Search
CPC .............. H04L 63/1433; H04L 63/1425
See application file for complete search history.

(56) References Cited

U.S. PATENT DOCUMENTS

| | | | |
|---|---|---|---|
| 9,722,895 B1* | 8/2017 | Sarukkai | H04L 43/0876 |
| 2013/0104236 A1* | 4/2013 | Ray | H04L 63/1433 726/25 |
| 2013/0174263 A1* | 7/2013 | Nunez Di Croce | G06F 16/951 726/25 |
| 2015/0088597 A1* | 3/2015 | Doherty | G06Q 10/0635 705/7.28 |
| 2015/0207809 A1* | 7/2015 | MacAulay | G06F 21/552 726/22 |
| 2015/0381649 A1* | 12/2015 | Schultz | H04L 63/1433 726/25 |
| 2016/0359895 A1* | 12/2016 | Chiu | H04L 63/1433 |
| 2016/0359912 A1* | 12/2016 | Gupta | G06F 16/162 |
| 2017/0054750 A1* | 2/2017 | Ward | G06F 21/577 |
| 2017/0153882 A1* | 6/2017 | Gopalakrishnan | G06F 8/65 |
| 2017/0220801 A1* | 8/2017 | Stockdale | H04L 63/1425 |
| 2017/0237764 A1* | 8/2017 | Rasumov | G06F 21/562 726/25 |
| 2018/0027006 A1* | 1/2018 | Zimmermann | H04L 63/0245 726/11 |
| 2018/0103052 A1* | 4/2018 | Choudhury | G06F 21/566 |
| 2018/0124096 A1* | 5/2018 | Schwartz | H04W 24/04 |
| 2018/0146004 A1* | 5/2018 | Belfiore, Jr. | G06F 21/577 |
| 2018/0176245 A1* | 6/2018 | Cornell | H04L 63/1433 |
| 2018/0183766 A1* | 6/2018 | Crabtree | H04L 9/3239 |
| 2018/0219894 A1* | 8/2018 | Crabtree | H04L 63/20 |
| 2018/0219919 A1* | 8/2018 | Crabtree | H04L 63/20 |
| 2018/0295154 A1* | 10/2018 | Crabtree | H04L 63/1408 |
| 2019/0182289 A1* | 6/2019 | White | G06N 20/00 |
| 2019/0222597 A1* | 7/2019 | Crabtree | H04L 63/1433 |

* cited by examiner

*Primary Examiner* — Joseph P Hirl
*Assistant Examiner* — Stephen T Gundry (57) ABSTRACT

Determining the cyber threat risk and vulnerability of an organization may be determined taking in to account the chain of service suppliers to the organization.

20 Claims, 7 Drawing Sheets

CYBER THREAT INTELLIGENCE THREAT AND VULNERABILITY ASSESSMENT OF SERVICE SUPPLIER CHAIN

RELATED APPLICATIONS

The current application claims priority to U.S. Provisional Patent Application 62/440,124 filed Dec. 29, 2016, the entire contents of which are hereby incorporation by reference.

TECHNICAL FIELD

The current disclosure relates to cyber security, and in particular to assessing an organization's supply chain cyber security risk.

BACKGROUND

Network security is increasingly important to individuals as well as organizations. Organizations may monitor network traffic at strategic locations, such as at a border gateway providing access to the Internet in order to identify potential security threats. Security threats may be determined based on computing devices communicating with known security risks as well as comparing network traffic with signatures of traffic associated with known threats.

While network monitoring for potential threats within an organization is an important aspect of threat detection and mitigation, it is desirable to assess an organization's exposure to threats along with its supply network of connected organizations. Exposure to vulnerabilities may be determined by scanning an organization's network for vulnerabilities such as unpatched servers, unsecured ports, etc. Such scanning of organizations for exposed vulnerabilities may help to provide an indication of potential security risks. While existing security techniques are useful, an additional, alternative and/or improved vulnerability assessment and threat detection for organizations is desirable to better characterize its cyber security risk.

BRIEF DESCRIPTION OF THE DRAWINGS

Further features and advantages of the present disclosure will become apparent from the following detailed description, taken in combination with the appended drawings, in which.

DETAILED DESCRIPTION

In accordance with the present disclosure there is provided a method of assessing a vulnerability exposure of an organization comprising: accessing summary network data for an organization over a monitoring period; determining suppliers of services to the organization based on the summary network data; determining a supplier vulnerability exposure of each of the suppliers of services to the organization; and determining the vulnerability exposure of the organization including a weighting of the determined supplier vulnerability exposure of each of the suppliers of services.

In a further embodiment, the method further comprises summarizing network data for the organization over the monitoring period.

In a further embodiment of the method, the network data for the organization comprises enrichment data.

In a further embodiment, the method further comprises generating the enrichment data by: collecting, by a plurality of network devices, network reporting information; and adding one or more tags of enrichment data to the network reporting information based at least in part on a portion of the network reporting information.

In a further embodiment of the method, summarizing network data comprises: generating for the monitoring period one or more session summaries of network flows occurring in the network data.

In a further embodiment, the method further comprises generating one or more organization traffic and threat summaries over the monitoring period.

In a further embodiment of the method, each of the one or more session summaries of network flows comprise one or more of: a client IP address; a client organization; a client industry; a client country; a server IP address; a server organization; a server industry; a server country; a transport protocol; a service port; a traffic direction; a NetFlow sampling resolution; a minimum, a maximum, a total duration of sessions during the monitoring period; a minimum, a maximum, a total number of packets of sessions during the monitoring period; a minimum, a maximum, a total number of bytes of sessions during the monitoring period; the total flows; and a matrix of total flows in slices of time smaller than the monitoring period; and wherein each of the one or more daily organization traffic and threat summaries comprises one or more of: an organization; an industry; a destination IP; a destination organization; a destination industry; a destination country; a destination threat indicator; a total number of flows in and out; and a total number of bytes in and out.

In a further embodiment of the method, the monitoring period is one or more of: an hour; a day; a week; and a month.

In a further embodiment of the method, suppliers of services to the organization are determined from the summarised network data based on a service port of one or more communication flows associated with a supplier of a service, a transport protocol of the one or more communication flows associated with the supplier of the service and an amount of traffic transmitted between the supplier of the service and the organization.

In a further embodiment, the method further comprises one or more of: storing the determined vulnerability exposure; using the determined vulnerability exposure to determine if one or more alerts should be generated; and displaying an indication of the determined vulnerability exposure.

In accordance with the present disclosure there is further provided a system for assessing a vulnerability exposure of an organization comprising: a plurality of network devices each collecting network reporting information; and a collection of at least on cyber-threat intelligence (CTI) infrastructure server, the collection configured for: accessing summary network data for an organization over a monitoring period; determining suppliers of services to the organization based on the summary network data; determining a supplier vulnerability exposure of each of the suppliers of services to the organization; and determining the vulnerability exposure of the organization including a weighting of the determined supplier vulnerability exposure of each of the suppliers of services.

In a further embodiment of the system, the collection is further configured for summarizing network data for the organization over the monitoring period.

In a further embodiment of the system, the network data for the organization comprises enrichment data.

In a further embodiment of the system, the collection is further configured for: generating the enrichment data by: collecting, by a plurality of network devices, network reporting information; and adding one or more tags of enrichment data to the network reporting information based at least in part on a portion of the network reporting information.

In a further embodiment of the system, summarizing network data comprises: generating for the monitoring period one or more session summaries of network flows occurring in the network data.

In a further embodiment of the system, the collection is further configured for: generating one or more organization traffic and threat summaries over the monitoring period.

In a further embodiment of the system, the each of the one or more session summaries of network flows comprise one or more of: a client IP address; a client organization; a client industry; a client country; a server IP address; a server organization; a server industry; a server country; a transport protocol; a service port; a traffic direction; a NetFlow sampling resolution; a minimum, a maximum, a total duration of sessions during the monitoring period; a minimum, a maximum, a total number of packets of sessions during the monitoring period; a minimum, a maximum, a total number of bytes of sessions during the monitoring period; the total flows; and a matrix of total flows in slices of time smaller than the monitoring period; and wherein each of the one or more daily organization traffic and threat summaries comprises one or more of: an organization; an industry; a destination IP; a destination organization; a destination industry; a destination country; a destination threat indicator; a total number of flows in and out; and a total number of bytes in and out.

In a further embodiment of the system, the monitoring period is one or more of: an hour; a day; a week; and a month.

In a further embodiment of the system, suppliers of services to the organization are determined from the summarised network data based on a service port of one or more communication flows associated with a supplier of a service, a transport protocol of the one or more communication flows associated with the supplier of the service and an amount of traffic transmitted between the supplier of the service and the organization.

In a further embodiment of the system, the collection is further configured for one or more of: storing the determined vulnerability exposure; using the determined vulnerability exposure to determine if one or more alerts should be generated; and displaying an indication of the determined vulnerability exposure.

Internet service providers (ISPs) or other network providers provide a network that connects organizations and individuals to each other as well as to network services. A large amount of data from both individual consumers as well as corporate and organizational consumers may travel over the ISP's network. This data may be useful in detecting potential risks, threats, or vulnerabilities. However, leveraging the large amount of data in a meaningful manner presents a challenge due to the volume of data required to be processed. A cyber-threat intelligence (CTI) infrastructure described further below allows the volume of network data to be processed. As described further below, the CTI infrastructure may be used to identify service suppliers of a particular organization and use the service supplier chain information, that is the chain of service providers that supply services to an organization, in determining a threat and vulnerability exposure of the particular organization.

Figure 1:
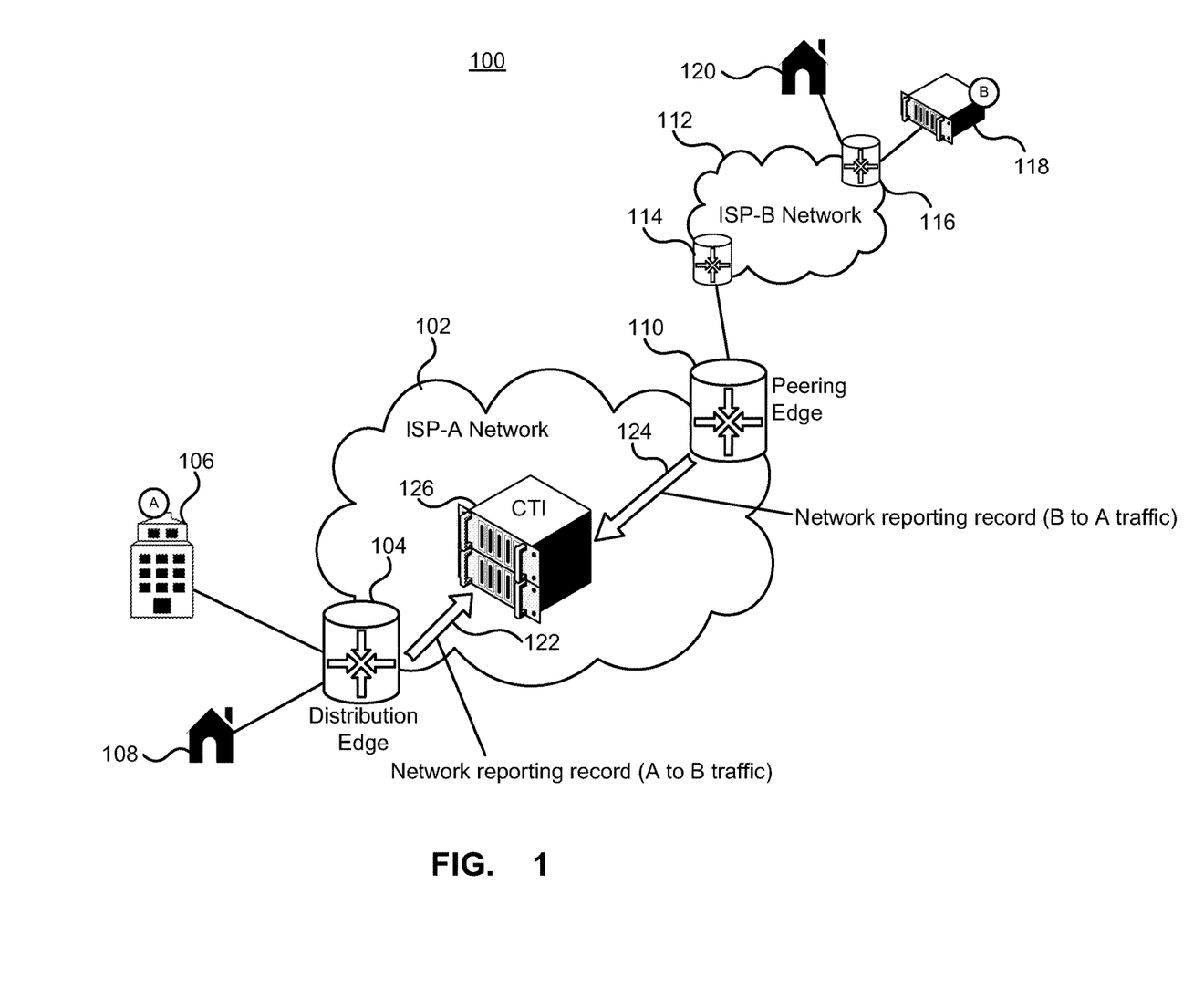
FIG. 1 depicts a network environment incorporating a cyber-threat intelligence infrastructure.

FIG. 1 depicts a network environment incorporating a cyber-threat intelligence infrastructure. The environment 100 comprises a first ISP network 102 that comprises a plurality of distribution edge servers or devices 104 that connect end users to the ISP network 102. The end users are depicted as including an organization 106 as well as a home user 108. The first ISP network 102 may be connected to other networks at peering edge servers or devices 110. The second network 112 is similar to that of the first network 102 and may comprise a plurality of peering edge devices 114 and distribution edge devices 116 that connect customers of the second ISP to the second network 112. The customers may include web service providers 118, home customers 120 etc.

As depicted in FIG. 1 the edge devices 104, 110 generate NetFlow data for network traffic flowing through the edges. For example if a user at the organization A 106 accesses the web service B 118, network data will pass from organization A 116, to the distribution edge 104, through ISP A's network 102 to the peering edge 110 that connects ISP A's network 102 to ISP B's network through the respective peering edge 114. ISP B's network directs the traffic to the appropriate destination, namely server B 118. Server B responds, for example, with requested data, that travels over ISP B's network, to the peering edge 110 of ISP A's network 102, through the distribution edge 104 and to the organization A 106. Both the distribution edge and peering edges 104, 110, or devices associated with them, generate NetFlow data 122, 124 from the traffic flow carried over the edge devices. As depicted, the distribution edge device 104 provides a NetFlow record of the traffic flow from point A to point B, while the peering edge device 110 provides a NetFlow record of the traffic flow from B to A. The NetFlow data is provided to the CTI processing infrastructure 126, which is depicted as a plurality of servers. The CTI processing infrastructure 126 allows for processing the large volume of data generated from the network traffic. Although described as receiving NetFlow data, the CTI processing infrastructure 126 may receive additional and/or alternative network data including, sFlow data, firewall information, IPFIX data, DNS data etc. The CTI infrastructure comprises a plurality of data collection points within the ISP network 102, such as the distribution and peering edges 104, 110, that provide network traffic data to the CTI processing infrastructure 126. The CTI processing infrastructure processes the received data in order to provide cyber threat intelligence (CTI) information to the ISP's customers. The CTI information can provide information as to how vulnerable an organization is to threats. In determining the organization's threat risk and vulnerability, the CTI processing infrastructure may determine service providers that provide services to the organization over the ISP's network 102. Determining service providers of the organization allows an overall threat risk and vulnerability to be determined that accounts for potential risk exposures of the service providers.

Figure 2:
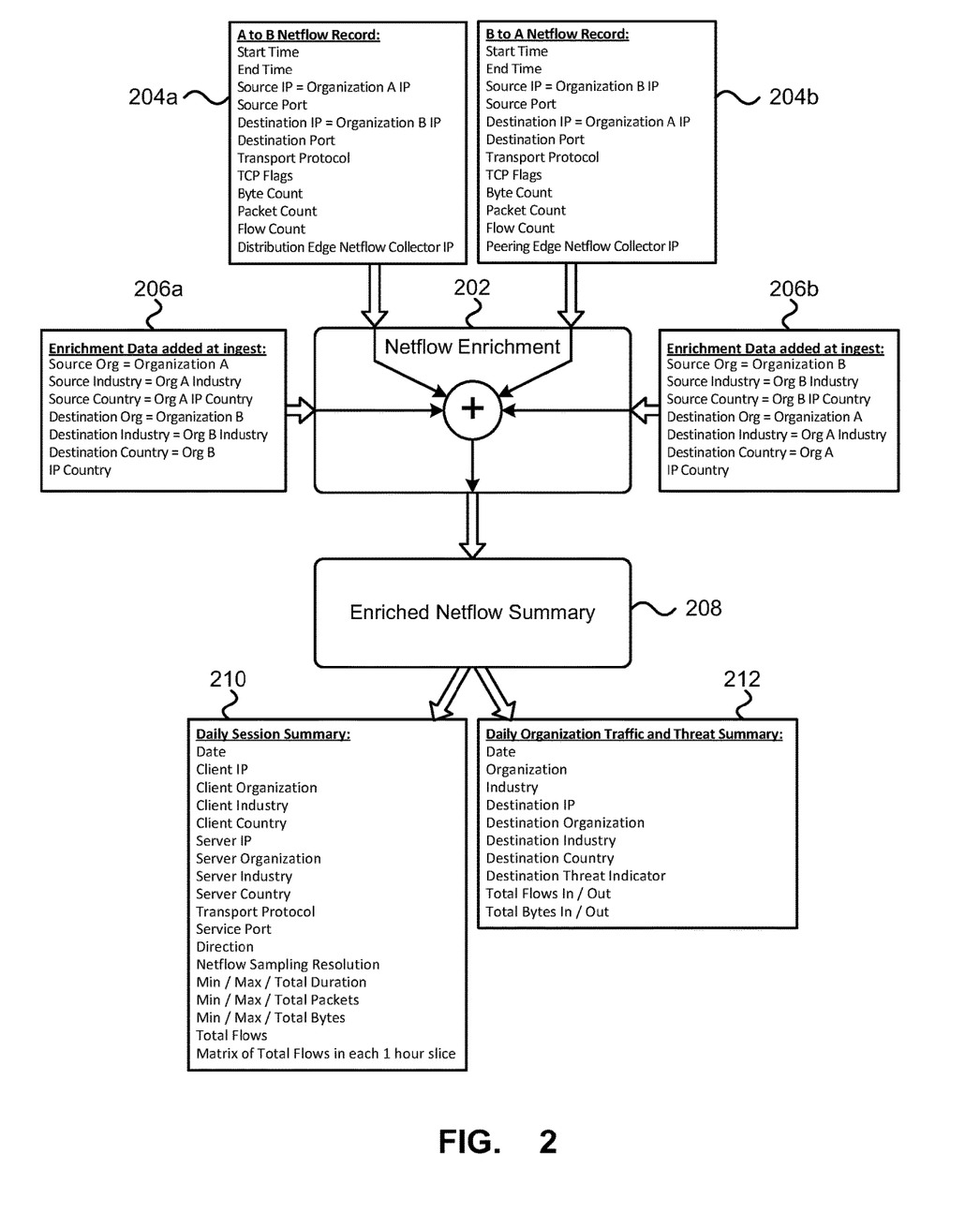
FIG. 2 depicts enhancing and summarizing NetFlow data.

FIG. 2 depicts enhancing and summarizing NetFlow data. The NetFlow data is enhanced and summarized in order to allow the CTI processing to make use of the large amount of data. A NetFlow enrichment component 202 may be part of the CTI infrastructure 126 described above with reference to FIG. 1. The NetFlow enrichment component 202 receives NetFlow records pertaining to traffic flowing between endpoints, such as organization A 106 and web server B 118. As depicted, the NetFlow enrichment data may receive NetFlow records of data from A to B 204a as well as traffic flowing from B to A 204b. The NetFlow enrichment component 202 receives the NetFlow records 204a, 204b and combines the records with enrichment data 206a, 206b. As depicted, a NetFlow record may include start and end times of the flow, source IP address and port information as well as destination IP address and port information. The NetFlow record may further include information on the transport protocol, such as TCP or UDP, TCP flags information from the flow, a count of the number of bytes and packets as well as a count of the flows of the record. The NetFlow record may also include an IP address of the edge device collecting the NetFlow data. The particular information included in the NetFlow records 204a, 204b may include additional information or alternatively, not all fields may be included. The NetFlow enrichment component may add additional fields to the NetFlow record based on the information included in the received records 204a, 204b. The enrichment may include adding organization information based on the IP addresses, whether the source or destination IP address. IP addresses may be assigned to an organization, either statically or dynamically, and so the IP address may be correlated to the organization, as well as to a country or location. An organization may be associated with one or more industries. The enrichment may use a list, or other data structure, that categorizes organizations into the associated industries. The categorization of organizations may be provided by the ISP or by third parties.

Once the NetFlow records are enriched with the additional data, a summarizing component 208 may generate traffic flow summaries of the individual enriched NetFlow records. As depicted, the enriched NetFlow summary component 208 may generate daily session summaries 210 of the different communication sessions for the day as well as overall daily summaries of all communication sessions for each organization 212. The enriched dataflow and summary information may be used in determining the service suppliers for a particular organization. Further information that may be used in assessing the organization's threat risk and vulnerability may include information of applications running at the organization that are known to have vulnerabilities, the frequency of unencrypted application and protocols.

As depicted the daily session summaries 210, provide summaries of the flows between a particular client and server. The port numbers of the source and destination organization may be used as an indication of which of the source and destination are acting as the client and server respectively. For example, some servers may use well known port numbers. Additionally, if unknown ports are used, a comparison between the port numbers may be made and the larger port used to identify the client and the smaller port number used to identify the server. The directionality of a flow may be determined as being either from the client to the server or as from the server to the client. For example, if the source port of the flow is identified as the server, the direction may be from the server to the client. Similarly, if the source port of the flow is identified as the client, the direction may be from the client to the server.

The daily session summaries 210 of a flow between a client and server may include date and time information, client and server information including the IP address, associated organization, industry, and country as well as transport protocol information, an associated service port as well as a direction of the flow. The daily session summary may further include information such as a NetFlow sampling resolution, minimum/maximum/totals of the flow duration, number of packets and number of bytes as well as the total flows and a matrix of total flows in 1 hour slices, or other lengths of time.

The daily organization traffic and threat summaries 212 may provide a further summary of the summarised data flows 210. The daily organization traffic and threat summaries 212 are summarized at the organizational level and provide a summary of the traffic between the organization and various destinations. The summaries 212 may include data and time information as well as the organization and industry information. The summaries may further include destination IP, organization, industry and country as well as a threat indicator of the destination. The summaries 212 may also include a summary of the total flows in and out as well as the total bytes in and out.

The enrichment and summarization of the NetFlow data allows large amounts of NetFlow records to be processed to include relevant information and summarised to condense the information for subsequent use in determining an organization's overall network security risk.

Figure 3:
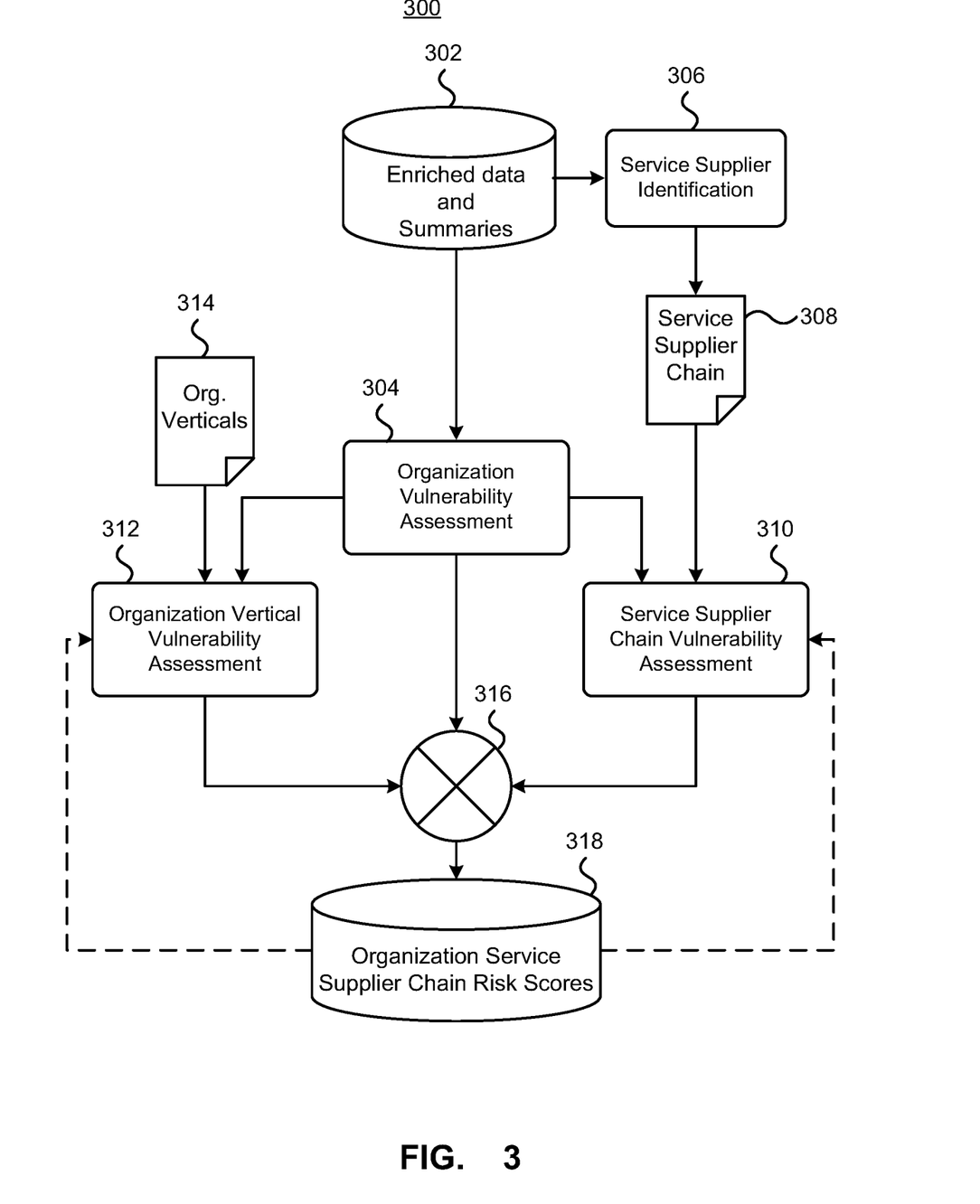
FIG. 3 depicts a process for service supplier chain risk assessment.

FIG. 3 depicts a process for service supplier chain risk assessment. The process 300 uses the enriched and summarized data 302 when performing an organization's threat and vulnerability assessment 304. The organization's individual threat and vulnerability assessment, that is the organization's threat and vulnerability without accounting for the organization's supplier chain, may be determined based on various data including the enriched and summarised NetFlow data to and from the organization as well as other information, such as port scans against IP addresses of the organization, manual surveys, and third party threat assessments. The threat and vulnerability assessment may be based on a weighted combination of the information or through other statistical methods.

The overall organization's risk is determined as the individual organization's threat and vulnerability exposure combined withthe threat and vulnerability exposure of service suppliers of the organization. The determination of the chain of service suppliers of an organization may be determined from the summary information 302. A service supplier identification component 306 may determine the service supplier chain 308 for different organizations. The service supplier chain 308 may provide a list of organizations that are determined to provide services to an organization based on the network data. on the service supplier chain 308 may be identified based on organizations that maintain frequent and persistent trusted connectivity with the organization, such as, but not limited to, VPN tunnels.

The supplier chain for an organization may be identified through consultation with the organization to directly identify suppliers, through machine learning model recommendations from network traffic, as well an analyst's interpretation of available information. The automatic identification of a service supplier may be based on the generated daily session summaries aggregated over a number of days, for example from 5-60 or more days. The summary information may be aggregated over the monitoring time for various service ports that correspond to known ports that pose a potential information security risk. These ports may include, for example ports 500 and 4500 for VPN traffic, port 22 for SSH traffic, port 34 for Telnet traffic as well as other ports that may be applicable for an organization and its industry. Potential supplier candidates may by identified as actual suppliers based on the service port information, the number of days the connection or communication has been active, the duration and number of sessions as well as total bytes sent between the supplier and organization. Table 1 below depicts an example of aggregated traffic data over a 30 day period for potential service suppliers to an organization.

TABLE 1

Table of aggregated supplier traffic data

| Supplier | Service Port | Days Active | Duration | Sessions | Volume |
|---|---|---|---|---|---|
| SupplierCandidate1 | 4500 | 30 | 600 | 1,200 | 459339493 |
| SupplierCandidate2 | 500 | 25 | 200 | 33 | 34234324 |
| SupplierCandidate2 | 22 | 12 | 24 | 50 | 34324 |
| SupplierCandidate3 | 23 | 3 | 2 | 4 | 2343435 |
| SupplierCandidate3 | 22 | 1 | 2 | 1 | 25201 |

From table 1, SupplierCandidate1 has had a VPN connection with the organization every day in the 30 day tracking period, with a large number of sessions of a long duration. Further, a large volume of traffic has been sent between the organization and the VPN connection of SupplierCandidate1. Accordingly, SupplierCandidate1 may be the organization's service provider. Similarly, SupplierCandidate2 may be considered to provide a service to the organization based ports used for traffic, the days active, duration, number of sessions and the volume of traffic. In contrast, SupplierCandidate3 may not be considered as a service provider based on the ports, number of days the connection has been active during the monitoring period, the number of sessions and duration as well as the traffic volume. From the above, SupplierCandidate1 and SupplierCandidate2 would be considered as the organization's supplier chain.

A service supplier chain threat and vulnerability assessment component 310 may determine the threat risk and vulnerability exposure of an organization due to other organizations it maintains trusted relationship with. The supply chain threat and vulnerability may be determined as a weighted sum of the exposure of the individual organizations of the service supplier chain. For each service supplier in the chain 308, the service supplier chain threat risk and vulnerability assessment 310 may determine the supplier's threat risk and vulnerability, or may receive the threat risk and vulnerability from the threat risk and vulnerability assessment component 305. The service supplier chain threat risk and vulnerability assessment uses the threat risk and vulnerability of each supplier in the service supply chain to determine the overall threat risk and vulnerability exposure resulting from the organization's service suppliers.

In addition to the supplier service chain threat risk and vulnerability exposure, the organization's overall risk exposure may be based on a particular vertical market the organization is in. For example, a banking institution may be of a higher risk than a grocery store. Accordingly, the organization's risk may be determined based on the vertical the organization operates in, which may be specified in a list 314 providing information on organizations and their verticals. The vertical information 314 may be used by a vertical threat risk and vulnerability assessment component 312. The organization's total service supplier chain risk score may be determined as a weighted sum 316 of the organization's individual threat risk and vulnerability assessment, the threat risk and vulnerability assessments of the organization's service suppliers and the risk assessment of the vertical of the organization. The determined risk score may be stored in a database or similar structure 318 for further monitoring.

Figure 4:
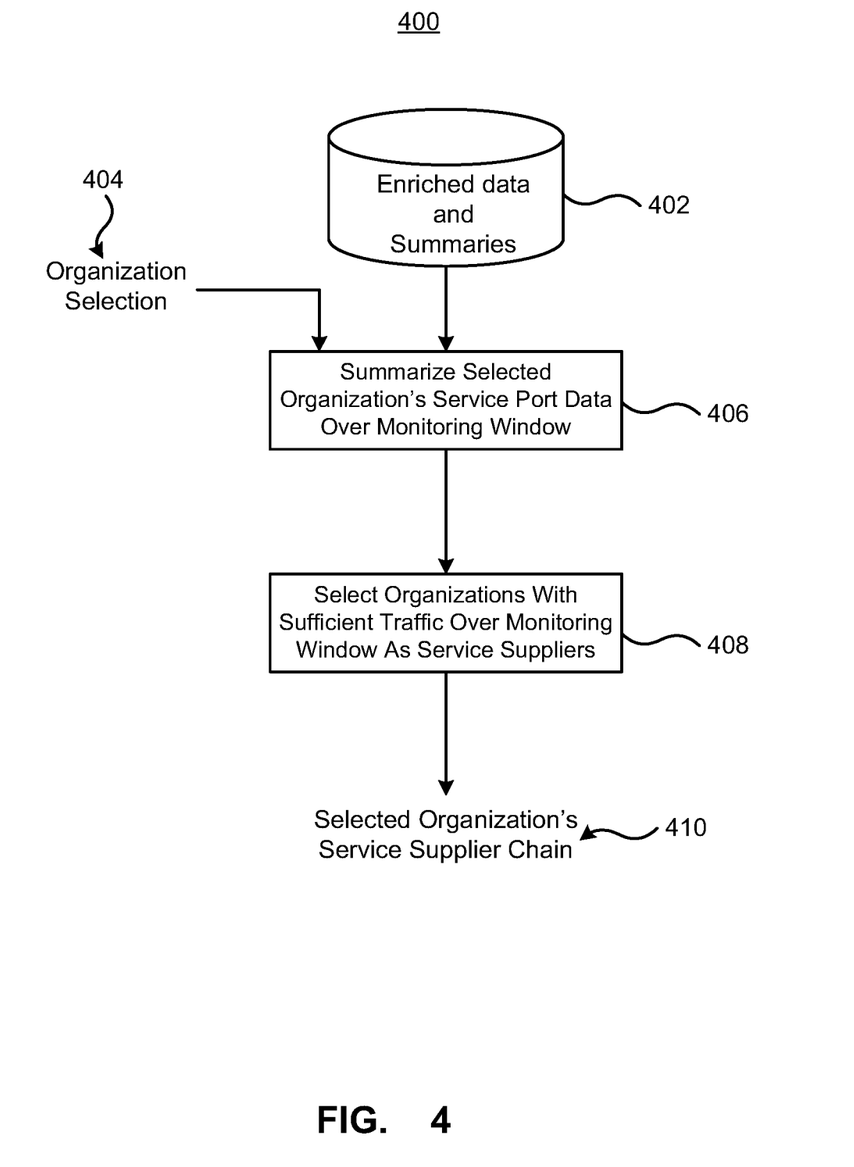
FIG. 4 depicts a process for determining an organization's service supplier chain.

FIG. 4 depicts a process for determining an organization's service supplier chain. The process 400 uses the summarized traffic information 402 for the different organization. An indication of the organization 404 for which the supplier chain information is being determined is provided and the selected organizations service port data is summarized, or summed together, for a monitoring window. The monitoring window may be a period of time that is sufficient to determine the relationships based on traffic flow. For example the window may be from a day, week, month or longer. The traffic information may be grouped by service port, application or other characteristics of the data. Once the data for the monitoring period is summarized, the suppliers with data flows meeting some characteristic, such as the frequency of traffic flow, the volume of traffic, etc. may then be selected 408 and provided as the selected organization service supplier chain 410. The supplier chain information may be used in determining the organization's overall threat risk and vulnerability assessment.

Figure 5:
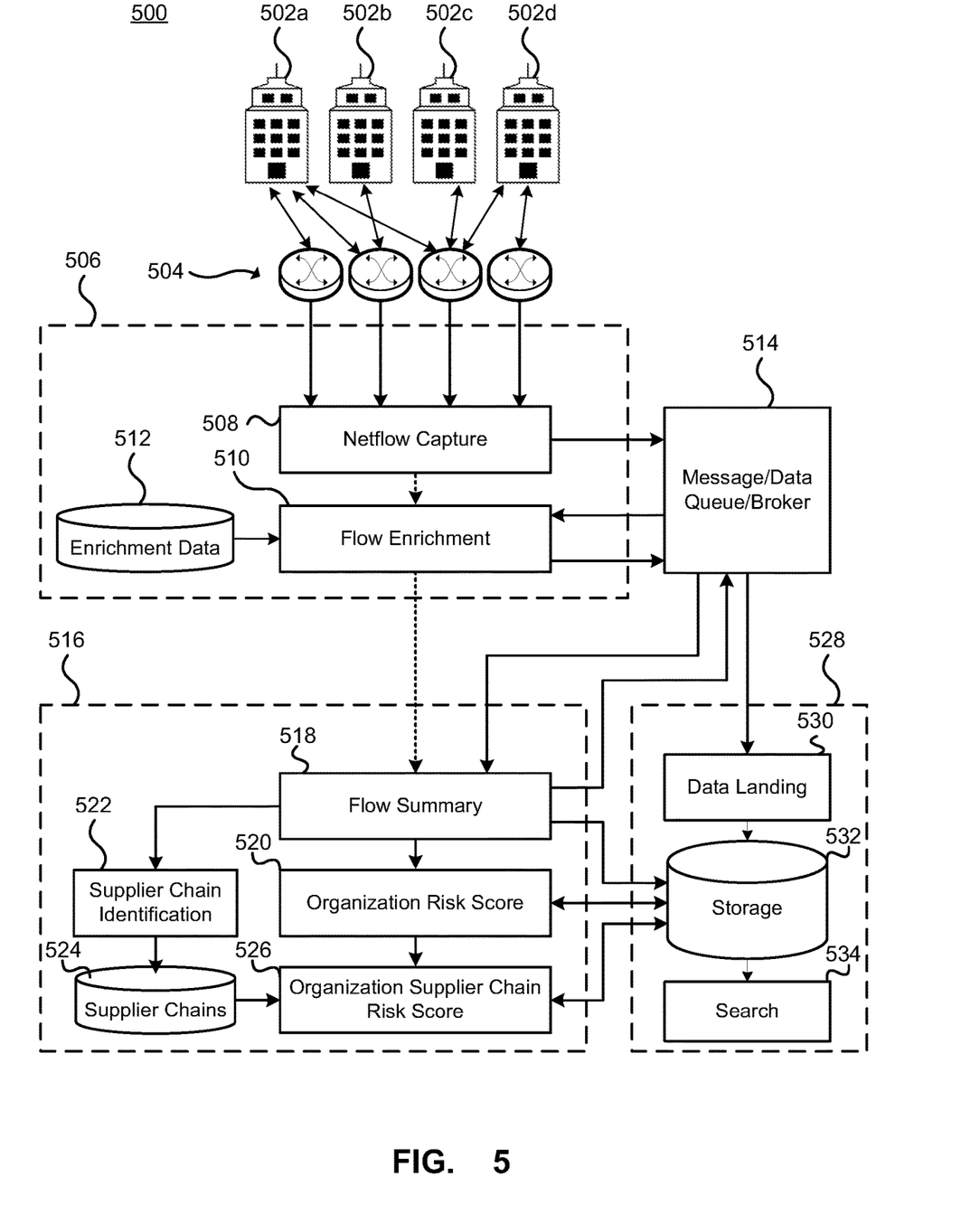
FIG. 5 depicts components of a cyber-threat intelligence system.

FIG. 5 depicts components of a cyber-threat intelligence system. The system 500 allows the threat risk of one or more organizations 502a, 502b, 502c, 502d (referred to collectively as organizations 502) to be determined. The system 500 includes a plurality of network monitoring devices 504 that monitor traffic passing to and from one or more of the organizations. The network monitoring devices 504 may be located at distribution edges of an Internet Service Provider's (ISP) access network. The monitoring devices 504 capture information about traffic flows passing through the monitoring devices 504. The captured traffic information collected at the monitoring devices 504 may be transmitted to flow processing functionality 506 that can be implemented by one or more CTI servers, such as servers of the CTI processing infrastructure 126 in FIG. 1.

The ingestion and enrichment functionality 506 includes flow data capture functionality 508 that receives flow data from the monitoring devices 504 and ingests the data for further processing. The ingestion processing by the flow data capture functionality 508 provides rapid ingestion of the data collected by the monitoring devices 504 in order to quickly process large amounts of flow data provided by the monitoring devices 502. The flow data capture functionality 508 ingests the flow data and flow enrichment functionality 510 processes the data to enrich the captured flow data, which may include various enrichments, including for example identifying a direction of the flow or whether a source is acting as a client or server, or adding additional information from enrichment data 512, such as an organization associated with an IP address, an type of industry the organization operates in, a vertical market the organization operates in, location information for the IP address, as well as other possible data that may be provided based on the data flow information. Although the enrichment data 512 is depicted is a database, it is contemplated that the enrichment data could be provided as one or more databases or services that can provide associated enrichment data in response to a query. As an example, an enrichment service may supply an organization's name when queried with an IP address. Although the flow enrichment functionality 510 processes the data ingested by the flow data capture functionality 508 in order to add additional information, it may not receive the ingested data directly from the capture functionality 508. Rather, as depicted, the flow data capture functionality 508 may ingest the data flow from the monitoring devices and add the data to a message/data queue/broker functionality 514 (referred to message broker 514 for brevity). The flow enrichment functionality 510 may then retrieve the ingested data from the message broker 514, enrich the retrieved data and then add the enriched data back to the message broker 514.

In addition to the ingestion and enrichment functionality 506, one or more servers within the CTI infrastructure, such as that depicted in FIG. 1, may implement supplier chain scoring functionality 516. The supplier chain scoring functionality 516 determines an organizations security risk using the data captured by the monitoring devices 502. The supplier chain scoring functionality 516 may include flow summary functionality 518 that retrieves enriched data from the message broker 514 and processes the retrieved enriched data to generate a summary of different flows for an organization. The flows can be summarized on an hourly basis, a daily basis, or other segments of time for each data flow between a particular client IP address and server IP address. The summarized flow information may include aggregate information of each individual flow, including for example, a date, a client IP address, the client organization associated with the IP address, the client industry and country the organization operates in, a server IP for the flows being summarized, an organization associated with the server IP address, an industry the server organization operates in as well as a country of the server organization, the transport protocol of the flow, the service port of the flow as well as a direction of the flow. The direction of the flow may be determined, or at least estimated, based on the port number since typically a server port number may be known or may be above a certain range. The flow summary may also include a netflow sampling resolution as well as minimum, maximum and total values for the flow durations, flow packets, and bytes. The flow summary information may further include an indication of the total number of individual flows that are summarized in a particular flow summary as well as a matrix of the total flows in one hour slices over the summary time. The flow summaries, as well as other information such as the enriched flow data and/or the raw flow data, may be processed to determine an organization's risk score. The risk score for an organization may be determined by organization risk score functionality 520. The individual risk score for an organization may be evaluated without regard to the organization's suppliers. For example, the individual risk score may be based on identifying possible threat patterns in the captured flow data to and from the organization.

The flow summary information may also be used by supplier chain identification functionality 522 to identify network based suppliers to an organization. In particular, supplier relationships may be identified based on an amount of traffic to and/or from a particular IP address or organization, a number of days the connection has been active, an average duration of the connections, the number of sessions or connections as well as a volume of data between the two organizations. The organizations identified as suppliers to a particular organization may be stored, for example in a supplier chain database 524 or other data structure.

The identified supplier chain for an organization may then be used to improve a risk score for an organization. In particular, an organization supplier chain risk score functionality may modify the individual risk score of an organization based on the risk associated with different organizations identified as part of the supplier chain. That is an organization's risk score may be modified based on a risk score associated with other organizations that supply network services to the organization. As an example, if a first organization uses a service provided by the second company and provides the second company access to the first company's network, if the second company is exposed to a threat, the first company may be exposed to increase risk due to the network access provided to the potentially comprised second organization.

The CTI infrastructure may further comprise data store functionality 528 for storing the information generated by other components including the message broker 514, the flow summaries, organization risk scores and organization supplier chain risk scores as well as other information including possibly the supplier chains. The data storage 528 may include data landing functionality 530 for retrieving data from the message broker 514, including for example the raw flow data, the enriched flow data, flow summaries as well as any other data on the message broker 514. The data landing functionality 530 may retrieve the data from the message broker 514 and store it in a desired data structure, such as for example a database, a data warehouse or data lake structure. The storage 532 may be stored across numerous physical locations in a distributed manner, such as in a Hadoop Distributed File System (HDFS). In addition to the data landing functionality 530 and storage functionality 528 the data store functionality 528 may also include search functionality 534 for searching the information stored in the storage 532. The search functionality 534 may be for example provided by elastic search or other search platforms.

Figure 6:
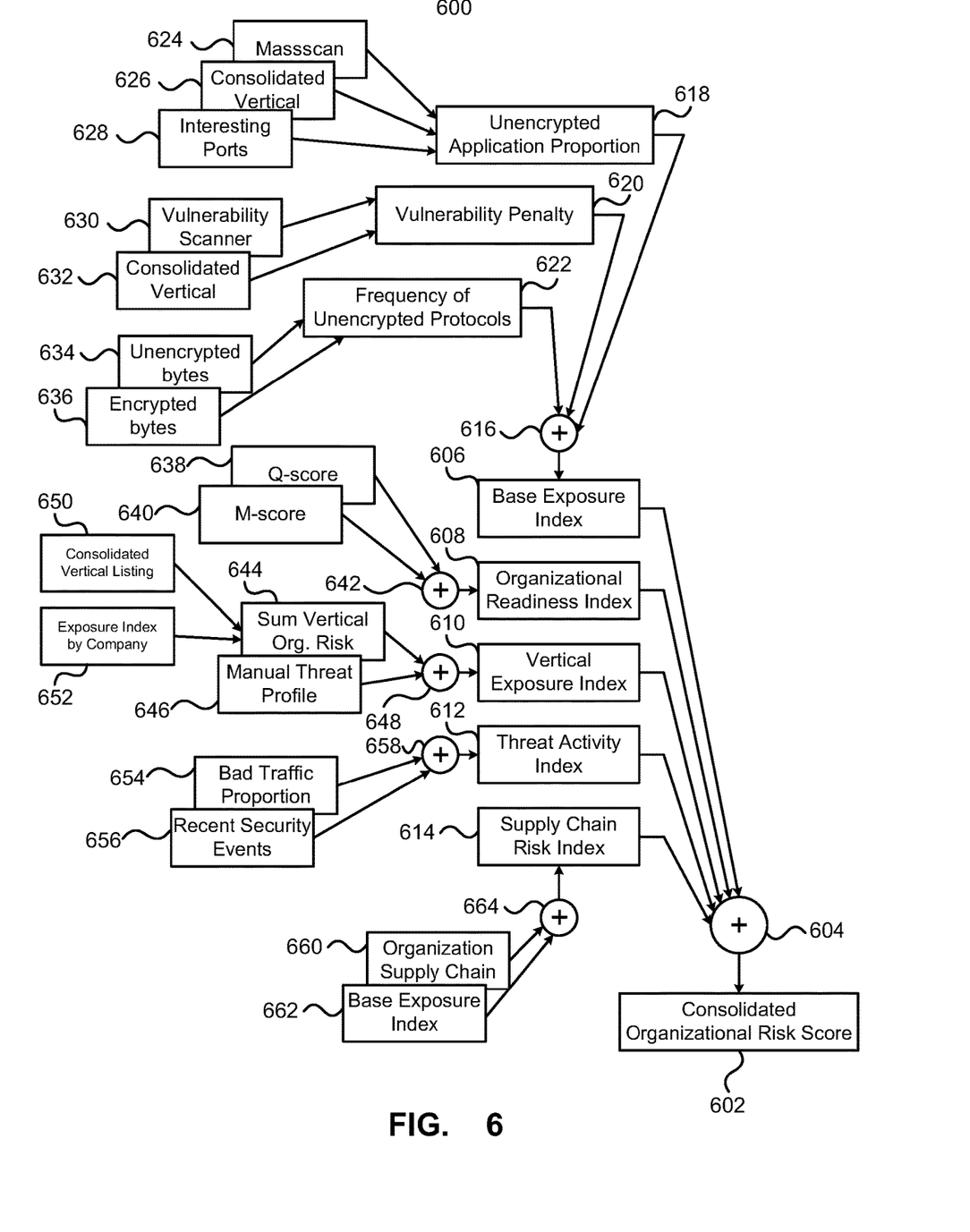
FIG. 6 depicts calculation of a consolidated organizational risk score.

FIG. 6 depicts calculation of a consolidated organizational risk score. The consolidated organizational risk score 602, which is also referred to as the organization's supplier chain risk score, is computed as a weighting summation 604 of a number of different components 606-614. The individual components 606-614 include components that may be considered as providing the organization's base risk score, which is determined without consideration of the risk posed to the organization by its suppliers. The individual components may also include components that relate to risk exposure outside of the organization. The components related to the organization's base score include a base exposure index 606 as well as an organizational readiness index 608. Components related to external factors include a vertical exposure index 610, a threat activity index 612 and a supply chain risk index 614.

The base exposure index 606 may be determined from a weighted summation 616 of an unencrypted application proportion 618, a threat risk and vulnerability penalty 620 and a frequency of unencrypted protocols 622. The unencrypted application proportion 618 can provide an indication of what proportion of an organization's traffic is associated with unencrypted applications. The determination may be based on mass scan information 624 that can provide an indication of externally accessible ports on the organization's network, information about a consolidated vertical 626 the organization operates in, which may be used to provide information about the possible applications that may be used in the vertical as well as other interesting ports 628 that the organization may use. The threat risk and vulnerability penalty 620 may be based on a threat risk and vulnerability scanner 630 along with consolidated vertical information 632. The threat risk and vulnerability scanner 630 can provide information about potential vulnerabilities that have been detected on the organization's network. The consolidated vertical 632 can be used to identify which of possible vulnerabilities may pose a greater risk for the organization. The frequency of unencrypted protocols 622 can be determined using a total number of unencrypted bytes 634 and the total number of encrypted byte 636. The frequency of unencrypted protocols 622 can be the ratio of unencrypted bytes to the total number of bytes.

In addition to the base experience score 606, the consolidated organization risk score 602 may account for security measures put in place by the organization. The organization's readiness index may be based on a Q-score 638, which may be a question score determined based on a security questionnaire completed by the organization. An M-score 640 may be used to provide a manual score that can be used to adjust an organization's security measures. The Q-score 638 and M-score 640 may be combined as a weighted summation 642 of the Q-score 638 and M-score 640.

The vertical exposure index 610 may be determined from a vertical organizational risk 644 and a manual threat profile 646 as a weighted sum 648. The manual threat profile 646 allows a threat exposure to be specified manually. The sum of vertical organisational risk 644 may be determined using a consolidated vertical listing 650 that can specify different organizations that are in the same vertical as the organization for which the consolidated risk profile is being determined. A list of exposure indexes by company 652 may then be used to determine the sum of the organizational risk for the particular vertical.

The threat activity index 612 may be determined from a proportion of bad traffic 654 from the flow summary as well as any recent security events, such as detected threat signatures in the flow data 656. The bad traffic proportion and security events can be combined together as a weighted sum 658.

The supply chain risk index 614 may use the organization's supplier chain information 660 and base exposure index information 662 from the organizations in the supplier chain. The base exposure indexes of the organizations in the supplier chain can be combined together as a weighted sum 664.

Although a number of factors are depicted in FIG. 6 as contributing to the consolidated risk score for an organization, it is possible to use more or fewer components in the determination. The above has described the structure for determining a consolidate organization risk index, or score. An illustrative example with particular weightings is described below.

The consolidate organization risk index (CORI) may be determined as:
CORI=IF ((BEI*0.4+SCRI*0.4+VEI*0.1+ERI*0.1)+TAI)>1
   RETURN 1
ELSEIF ((BEI*0.4+SCRI*0.4+VEI*0.1+ERI*0.1)+TAI)>0
   RETURN ((BEI*0.4+SCRI*0.4+VEI*0.1+ERI*0.1)−TAI)
ELSE
   RETURN 0
   Where:
   BEI is a base exposure index;
   ERI is an enterprise readiness index;
   VEI is a vertical exposure index;
   TAI is a threat activity index; and
   SCRI is a supplier chain risk index;
   The BEI may be determined as:
BEI=IF (0.4*UAP+0.6*FER−VPEN)>0
   RETURN (0.4*UAP+0.6*FER−VPEN)
ELSE
   RETURN 0

Where:
   UAP is an unencrypted applications proportion;
   VPEN is a vulnerability penalty; and
   FER is a frequency of unencrypted protocols.
The UAP may be determined as:
UAP=IF UNENCRYPTEDPORTS==0:
   RETURN 0
ELSE
   RETURN UNENCRYPTEDPORTS/(UNENCRYPTEDPORTS+ENCRYPTEDPORTS)
Where:
   UNENCRYPTEDPORTS is a number of unencrypted ports in the summarised flow data; and
   ENCRYPTEDPORTS is a number of encrypted ports in the summarised flow data.
The VPEN may be determined as:
VPEN=IF (UntrustedCertificateCount*0.2+CriticalVulnerabilities*0.5+MajorVulnerabilities*0.3)<1
   RETRUN (UntrustedCertificateCount*0.2+CriticalVulnerabilities*0.5+MajorVulnerabilities*0.3)
ELSE
   RETURN 1
Where:
   UntrustedCertificateCount is a number of untrusted certificates in the summarised flow data and/or determined from a vulnerability scanner;
   CriticalVulnerabilities is the number of 'critical' vulnerabilities within the organization determined from a vulnerability scanner; and
   MajorVulnerabilities is the number of 'Major' vulnerabilities within the organization determined from a vulnerability scanner.
The FER may be determined as:
FER=IF UNENCRYPTEDBYTES==0
   RETURN 0
ELSE
   RETURN UNENCRYPTEDBYTES/(UNENCRYPTEDBYTES+ENCRYPTEDBYTES)
Where:
   UNENCRYPTEDBYTES is a number of bytes sent and received over typically unencrypted ports; and
   ENCRYPTEDBYTES is a number of bytes sent and received over typically encrypted ports.
UNENCRYPTEDBYTES may be determined from stored data using a query such as:
SELECT
   SUM(BYTES) AS UNENCRYPTEDBYTES
FROM
NETFLOWSUMMARY
WHERE PORT in (80,21,25,23,53,143,110,8081,3389,587, 3306,111,8888,135,5900,445,389,5000,9100,139,1433)
   AND YEAR=X AND MONTH=Y
   AND CCOUNTRY='CA'
ENCRYPTEDBYTES may be determined from stored data using a query such as:
SELECT
   SUM(BYTES) AS ENCRYPTEDBYTES
FROM
NETFLOWSUMMARY
WHERE SERVICE in (443,22,995,465,993,1723,8443,990)
   AND YEAR=X AND MONTH=Y
   AND CCOUNTRY='CA'
The ERI may be determined as:
ERI=(QSCORE*0.4)+(MSCORE*0.6)

Where:
QSCORE may be a cumulative weighted answers to en enterprise readiness questionnaire rate from 0.00 to 1.00; and
MSCORE may be rated from 0.00 to 1.00 using private analysis readiness or using open source intelligence tools (OSINT) with regard to the organization's security threat readiness The VEI may be determined as:

VEI=(SOVR*0.6)+(TPMC*0.4)

Where:
SOVR is a sum of vertical organizational risk; and
TPMC is a threat profile manual coefficient.

The TAI may be determined as:

TAI=
BPROP+RPEN

Where:
BPROP is proportion of bad traffic to total traffic volume. The bad traffic may be identified using a threat database or other techniques for identify potentially mad traffic.
RPEN is a weighted sum of recent threat events.

The SCRI may be determined as:

SCRI=SUM(ORG_SUPPLYCHAIN(BEI))/(DISTINCT-COUNT(ORG_SUPPLYCHAIN))

Where:
ORG_SUPPLYCHAIN is a list of organizations related to the organization for which the CORI is being calculated by nature of an identified "RELATIONSHIP PORTS" or other supplier chain identification means; and
ORG_SUPPLYCHAIN(BEI) is the BEI for a particular organization in the list of related organizations.

Figure 7:
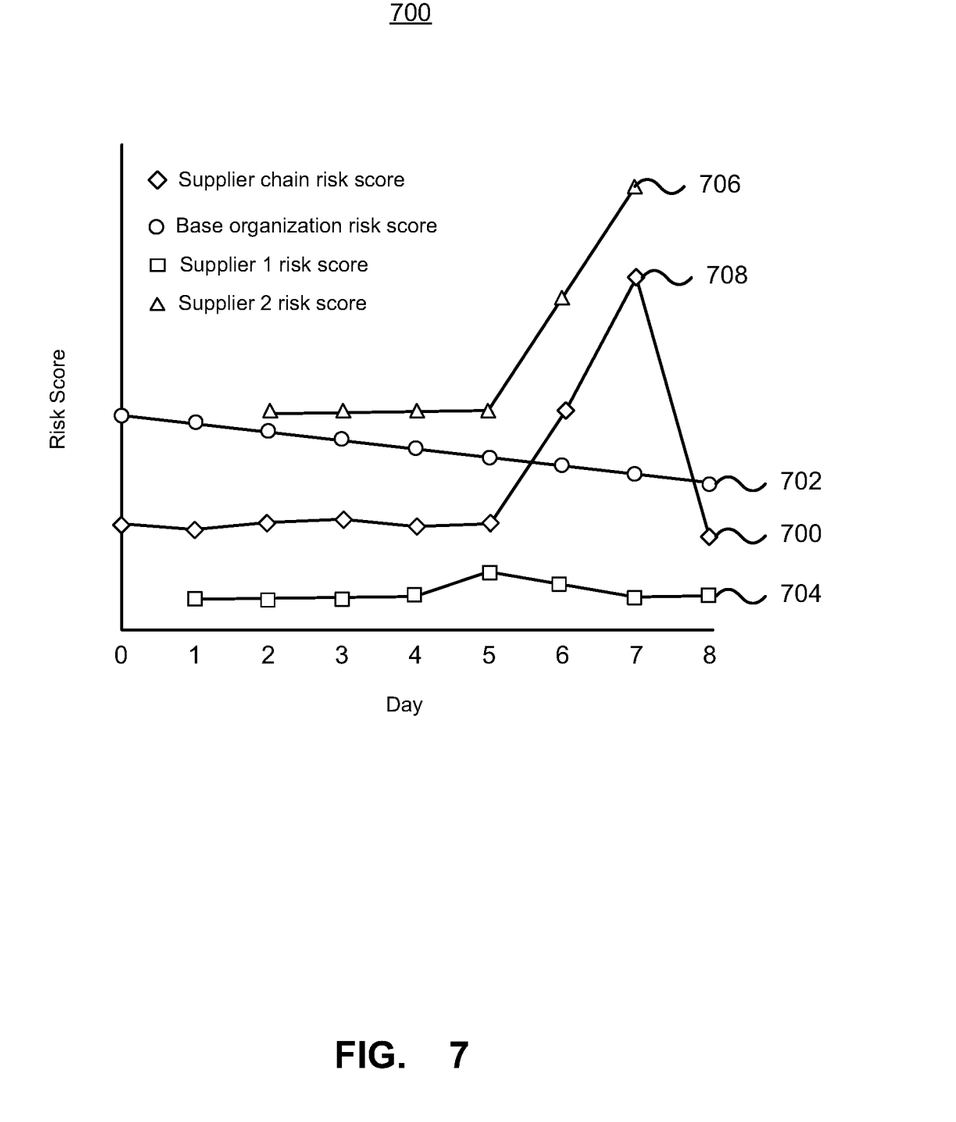
FIG. 7 depicts a graph of different risk scores.

FIG. 7 depicts a graph of different risk scores over time. The graph 700 illustrates the effect of the risk score of different suppliers on an organization. As depicted in FIG. 7 an organization may be associated with a base risk score 702 that can vary over time. The organization may use a number of suppliers to provide services to them and each of the suppliers may have an associated risk score 704, 706. The organization's risk score can be modified based on the supplier's risk score to provide an organization's supplier chain risk score 708. As depicted, the second supplier's risk score 706 sharply increases at day 5, which is reflected in the organization's supplier chain risk score 708. The supplier chain risk score can provide an indication to organizations of the risk exposure that takes into account the risks posed by their suppliers.

Various specific details have been described above. While certain features or functionality may be described in particular detail with regard to one device or component, it will be appreciated that the functionality or features may be applied to other devices or components. Further, although various embodiments of the devices, equipment, functionality, etc. are described herein, the description is intended to provide an understanding of the systems, methods and devices and as such certain aspects may not be described, or not described in as much detail as other aspects. The described systems, methods and devices are not the sole possible implementations, and the various descriptions systems, methods and devices herein will enable one of ordinary skill in the art to apply the teachings to other equivalent implementations without exercising any inventive ingenuity.

What is claimed is:

1. A method of assessing a vulnerability exposure of an organization comprising:
generating enrichment data by:
collecting, by a plurality of network devices, network reporting information; and
adding one or more tags of enrichment data to the network reporting information based at least in part on a portion of the network reporting information;
summarizing the enrichment data and storing as summary network data;
accessing stored summary network data for an organization over a monitoring period;
determining suppliers of services to the organization based on the summary network data;
determining a supplier vulnerability exposure of each of the suppliers of services to the organization; and
determining the vulnerability exposure of the organization including a weighting of the determined supplier vulnerability exposure of each of the suppliers of services.

2. The method of claim 1, wherein summarizing network data comprises:
generating for the monitoring period one or more session summaries of network flows occurring in the network data.

3. The method of claim 2, further comprising:
generating one or more organization traffic and threat summaries over the monitoring period.

4. The method of claim 3, wherein each of the one or more session summaries of network flows comprise one or more of:
a client IP address;
a client organization;
a client industry;
a client country;
a server IP address;
a server organization;
a server industry;
a server country;
a transport protocol;
a service port;
a traffic direction;
a NetFlow sampling resolution;
a minimum, a maximum, a total duration of sessions during the monitoring period;
a minimum, a maximum, a total number of packets of sessions during the monitoring period;
a minimum, a maximum, a total number of bytes of sessions during the monitoring period;
the total flows; and
a matrix of total flows in slices of time smaller than the monitoring period; and
wherein each of the one or more daily organization traffic and threat summaries comprises one or more of:
an organization;
an industry;
a destination IP;
a destination organization;
a destination industry;
a destination country;
a destination threat indicator;
a total number of flows in and out; and
a total number of bytes in and out.

5. The method of claim 3, wherein the monitoring period is one or more of:
an hour;
a day;
a week; and
a month.

6. The method of claim 1, wherein suppliers of services to the organization are determined from the stored summary network data based on a service port of one or more communication flows associated with a supplier of a service, a transport protocol of the one or more communication flows associated with the supplier of the service and an amount of traffic transmitted between the supplier of the service and the organization.

7. The method of claim 1, further comprising one or more of:
   storing the determined vulnerability exposure;
   using the determined vulnerability exposure to determine if one or more alerts should be generated; and
   displaying an indication of the determined vulnerability exposure.

8. A system for assessing a vulnerability exposure of an organization comprising:
   a plurality of network devices each collecting network reporting information; and
   a collection of at least on cyber-threat intelligence (CTI) infrastructure server, the collection configured for:
   generating enrichment data by adding one or more tags of enrichment data to the network reporting information based at least in part on a portion of the network reporting information;
   summarizing the enrichment data and storing the summarized enrichment data as summary network data;
   accessing stored summary network data for an organization over a monitoring period;
   determining suppliers of services to the organization based on the summary network data;
   determining a supplier vulnerability exposure of each of the suppliers of services to the organization; and
   determining the vulnerability exposure of the organization including a weighting of the determined supplier vulnerability exposure of each of the suppliers of services.

9. The system of claim 8, wherein summarizing network data comprises:
   generating for the monitoring period one or more session summaries of network flows occurring in the network data.

10. The system of claim 9, wherein the collection is further configured for:
    generating one or more organization traffic and threat summaries over the monitoring period.

11. The system of claim 10, wherein each of the one or more session summaries of network flows comprise one or more of:
    a client IP address;
    a client organization;
    a client industry;
    a client country;
    a server IP address;
    a server organization;
    a server industry;
    a server country;
    a transport protocol;
    a service port;
    a traffic direction;
    a NetFlow sampling resolution;
    a minimum, a maximum, a total duration of sessions during the monitoring period;
    a minimum, a maximum, a total number of packets of sessions during the monitoring period;
    a minimum, a maximum, a total number of bytes of sessions during the monitoring period;
    the total flows; and
    a matrix of total flows in slices of time smaller than the monitoring period; and wherein each of the one or more daily organization traffic and threat summaries comprises one or more of:
    an organization;
    an industry;
    a destination IP;
    a destination organization;
    a destination industry;
    a destination country;
    a destination threat indicator;
    a total number of flows in and out; and
    a total number of bytes in and out.

12. The system of claim 10, wherein the monitoring period is one or more of:
    an hour;
    a day;
    a week; and
    a month.

13. The system of claim 8, wherein suppliers of services to the organization are determined from the stored summary network data based on a service port of one or more communication flows associated with a supplier of a service, a transport protocol of the one or more communication flows associated with the supplier of the service and an amount of traffic transmitted between the supplier of the service and the organization.

14. The system of claim 8, wherein the collection is further configured for one or more of:
    storing the determined vulnerability exposure;
    using the determined vulnerability exposure to determine if one or more alerts should be generated; and
    displaying an indication of the determined vulnerability exposure.

15. A non-transitory computer readable medium having stored thereon software instructions that, when executed, cause a method of assessing a vulnerability exposure of an organization to be performed, the method comprising:
    generating enrichment data by:
        collecting, by a plurality of network devices, network reporting information; and
        adding one or more tags of enrichment data to the network reporting information based at least in part on a portion of the network reporting information;
    summarizing the enrichment data and storing as summary network data;
    accessing stored summary network data for an organization over a monitoring period;
    determining suppliers of services to the organization based on the summary network data;
    determining a supplier vulnerability exposure of each of the suppliers of services to the organization; and
    determining the vulnerability exposure of the organization including a weighting of the determined supplier vulnerability exposure of each of the suppliers of services.

16. The non-transitory computer readable medium of claim 15, wherein summarizing network data comprises:
    generating for the monitoring period one or more session summaries of network flows occurring in the network data.

17. The non-transitory computer readable medium of claim 16, wherein the method further comprises:
    generating one or more organization traffic and threat summaries over the monitoring period.

18. The non-transitory computer readable medium of claim 17, wherein each of the one or more session summaries of network flows comprise one or more of:
- a client IP address;
- a client organization;
- a client industry;
- a client country;
- a server IP address;
- a server organization;
- a server industry;
- a server country;
- a transport protocol;
- a service port;
- a traffic direction;
- a NetFlow sampling resolution;
- a minimum, a maximum, a total duration of sessions during the monitoring period;
- a minimum, a maximum, a total number of packets of sessions during the monitoring period;
- a minimum, a maximum, a total number of bytes of sessions during the monitoring period;
- the total flows; and
- a matrix of total flows in slices of time smaller than the monitoring period; and wherein each of the one or more daily organization traffic and threat summaries comprises one or more of:
- an organization;
- an industry;
- a destination IP;
- a destination organization;
- a destination industry;
- a destination country;
- a destination threat indicator;
- a total number of flows in and out; and
- a total number of bytes in and out.

19. The non-transitory computer readable medium of claim 15, wherein suppliers of services to the organization are determined from the stored summary network data based on a service port of one or more communication flows associated with a supplier of a service, a transport protocol of the one or more communication flows associated with the supplier of the service and an amount of traffic transmitted between the supplier of the service and the organization.

20. The non-transitory computer readable medium of claim 15, further comprising one or more of:
- storing the determined vulnerability exposure;
- using the determined vulnerability exposure to determine if one or more alerts should be generated; and
- displaying an indication of the determined vulnerability exposure.

* * * * *